March 28, 1944.  W. G. DE GRAY  2,345,037
SPOT WELDING METHOD
Filed Oct. 20, 1942
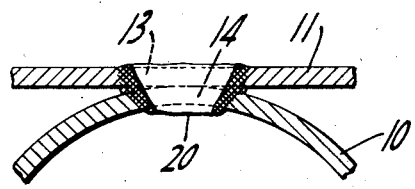
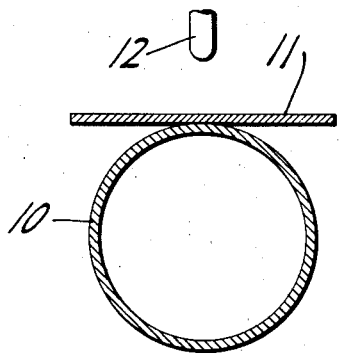
FIG. 1.  FIG. 2.
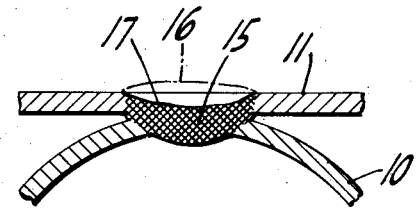
FIG. 3.
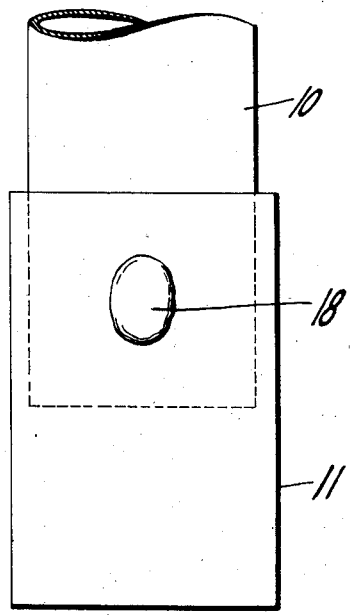
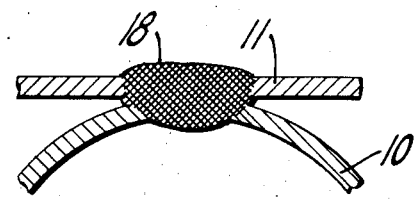
FIG. 5.  FIG. 4.
INVENTOR
William G. De Gray
BY
Bean Brooks, Buckley & Bean
ATTORNEYS Patented Mar. 28, 1944

2,345,037

UNITED STATES PATENT OFFICE 2,345,037

SPOT WELDING METHOD

William G. De Gray, Buffalo, N. Y., assignor to Bell Aircraft Corporation, Buffalo, N. Y.

Application October 20, 1942, Serial No. 462,710

7 Claims. (Cl. 219—10)

This invention relates to a method of welding and has particular reference to welding metal sheets flat-wise against each other, employing the electric arc as the heating and fusing medium.

The instant method may have varying application in the welding art but will be disclosed herein by way of example in connection with the joining of a metal plate against the periphery of a tube having a relatively thin wall. Prior art methods of welding elements of this general class have been unsatisfactory because of the uncertainty surrounding the operation. The percentage of faulty welds produced is extremely high by reason of the inability of the welder to accurately gauge the progress of the weld and the nature and strength of the joint being formed.

According to the principles of the present invention a novel arc welding technique is employed which results in secure welds of uniform quality and with no danger of insufficient fusion of the parts to each other. In the accompanying drawing:

Fig. 1 is a transverse cross-sectional view through a tube and sheet placed in proper position for welding, with an arc welding electrode indicated schematically;

Fig. 2 is a somewhat enlarged fragmentary view similar to Fig. 1 but showing a later step in the arc welding operation of the present method;

Fig. 3 is a view similar to Fig 2 showing a further subsequent step of the method;

Fig. 4 is a further similar view showing the completed weld; and,

Fig. 5 is an elevational view showing the surface of the weld of Fig. 4.

In the several figures of the drawing, like characters of reference denote like parts. The numeral 10 designates a tubular metallic workpiece and the numeral 11 designates a metallic sheet which is to be secured thereagainst in the tangent position shown in Fig. 1. In Fig. 1 the number 12 indicates the tip portion of a welding electrode which is being brought to operating position.

The present arc welding method is characterized by the fact that two distinct welding steps are pursued, but with the same arcing electrode and with a mere adjustment of the current density. In initiating the welding method the operator brings the electrode to the surface of the sheet 11 at a point where it is tangent to the tube 10 to initiate current flow. It is of course understood that the welding circuit includes the electrode 12 and the combination of the tube 10 and sheet 11 in series. After current flow is established the electrode is moved from the surface of the sheet 11 to produce an electrical arc of the desired length for efficient heating of the workpieces at one terminus of the arc.

In the first phase of operation, and having in mind that by way of example reference is had to the welding of stainless steel of an approximate order of thickness of 0.030 of an inch, a current of approximately 50 amperes is applied. The degree of heating is such that openings are formed through both the sheet and the underlying tube, as indicated at 13 and 14 respectively in Fig. 2.

When the opening 14 is substantially through the tube 10 the operator can readily discern the fact by the play of sparks within the interior of the tube. When the openings 13 and 14 are completely formed their walls are of fused metal, as indicated at 20 in Fig. 2, and such walls provide an initial weld bridging between the sheets 10—11 and are of suitable condition for receiving a build-up of further welding metal. For this latter purpose the current flow is reduced substantially to temperatures suited to non-oxidizing fusion, and in the example cited the current is cut to about 20 amperes. The electrode employed is of the composite type having a core of welding metal and a sheath of a suitable fluxing material. The operator then builds upon the welded side walls until the welding metal occupies the approximate volume indicated by the cross-hatched portion 15 of Fig. 3 plus the additional volume indicated by the dot and dash line 16 of that figure. The operator then preferably momentarily breaks the arc to permit a partial cooling and contraction of the weld which results in its surface receding to the full line designated 17 in Fig. 3. The arc is then reestablished and additional fused welding metal is applied to bring the resultant cooled weld to approximately the volume shown at 18 in Fig. 4.

In Fig. 5 the weld 18 is shown slightly elongate to increase the effective size of the welded spot without having the weld extend to points where the tube and the sheet are substantially spaced by reason of the arcuate configuration of the tube. While some degree of elongation of the spot is permissible, operation in accordance with the technique proposed herein is clearly distinguishable from seam welding by reason of the two step nature of the present method. The technique of the present invention is not applicable to continuous seam welding.

While a single specific instance and example of the method of the present invention has been described completely and illustrated in the drawing, it is to be understood that the invention is not limited otherwise than as defined in the appended claims.

What is claimed is:

1. A method of welding a metal plate to a metal tube which comprises first disposing a surface of the plate against the periphery of the tube and applying an electric arc to the opposite surface of the plate in a region of contact thereof with the tube and at a heat high enough to remove the material of the plate and tube to form registering openings extending entirely through the two elements, then reducing the heating value of the arc to a normal fusing temperature and filling the registering openings entirely with extraneous welding metal in the presence of a flux, said method being carried on continuously and completely with the arcing electrode located at the plate side of the joint.

2. A method of welding a metal plate to a metal tube which comprises first disposing a surface of the plate against the periphery of the tube and applying an electric arc to the opposite surface of the plate in a region of contact thereof with the tube and at a heat high enough to remove the material of the plate and tube to form registering openings extending entirely through the two elements, then reducing the flow of current through the arc to achieve a lower temperature suitable to normal fusion and filling the registering openings entirely with extraneous welding metal, said method being carried on continuously and completely with the arcing electrode located at the plate side of the joint.

3. A method of welding a metal plate to a metal tube which comprises first disposing a plurality of sheet metal work pieces in flat-wise engagement and applying an electric arc to the opposite surface of one of the pieces at a heat high enough to remove the material of the sheet metal work pieces to form registering openings extending entirely through the assembled pieces, then reducing the heating value of the arc to a fusing temperature and filling the registering openings entirely with extraneous welding metal in the presence of a flux, said method being carried on continuously and completely with the arcing electrode located at the plate side of the joint.

4. A method of welding a metal plate to a metal tube which comprises first disposing a plurality of sheet metal work pieces in flat-wise engagement and applying an electric arc to the opposite surface of one of the pieces at a heat high enough to oxidize and remove the material of the sheet metal work pieces to form registering openings extending entirely through the assembled pieces, then reducing the flow of current through the arc to achieve a lower temperature suitable to normal fusion and filling the registering openings entirely with extraneous welding metal, said method being carried on continuously and completely with the arcing electrode located at the plate side of the joint.

5. A method of welding a metal plate to a metal tube which comprises first disposing a surface of the plate against the periphery of the tube and applying an electric arc to the opposite surface of the plate in a region of contact thereof with the tube by means of an electrode of welding metal and at a heat high enough to oxidize and remove the material of plate and tube to form registering openings extending entirely through the two elements, then reducing the heating value of the arc to a fusing temperature and filling the registering openings entirely with welding metal in the presence of a flux, said method being carried on continuously and completely with the arcing electrode located at the plate side of the joint.

6. A method of welding a metal plate to a metal tube which comprises first disposing a surface of the plate against the periphery of the tube and applying an electric arc to the opposite surface of the plate in a region of contact thereof with the tube by means of an electrode of welding metal and at a heat high enough to oxidize and remove the material of a plate and tube to form registering openings extending entirely through the two elements, then reducing the heating value of the arc to a fusing temperature and filling the registering openings entirely with the welding metal of the electrode in the presence of a flux, said method being carried on continuously and completely with the arcing electrode located at the plate side of the joint.

7. A method of welding relatively thin metal plates flat-wise against each other which comprises first applying an electric arc to the opposite surface of one of the plates at a heat high enough to oxidize and remove the material of the plates and form registering openings extending entirely through the plates, then reducing the heating value of the arc to a fusing temperature and filling the registering openings entirely with extraneous welding metal in the presence of a flux, said method being carried on continuously and completely with the arcing electrode located at one side of the joint.

WILLIAM G. DE GRAV.